United States Patent
Glogau et al.

(10) Patent No.: US 6,912,658 B1
(45) Date of Patent: Jun. 28, 2005

(54) HIDING OF ENCRYPTED DATA

(75) Inventors: Jordan J. Glogau, Nanuet, NY (US); Edward J. Delp, III, West Lafayette, IN (US); Raymond B. Wolfgang, Exton, PA (US); Eugene Ted Lin, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 09/485,759

(22) PCT Filed: Aug. 21, 1998

(86) PCT No.: PCT/US98/17321

§ 371 (c)(1),
(2), (4) Date: Feb. 15, 2000

(87) PCT Pub. No.: WO99/11020

PCT Pub. Date: Mar. 4, 1999

Related U.S. Application Data

(60) Provisional application No. 60/056,724, filed on Aug. 22, 1997.

(51) Int. Cl.$^7$ .................................................. H04L 9/00
(52) U.S. Cl. ........................................ 713/176; 380/43
(58) Field of Search ..................... 380/43, 54, 253–254, 380/232, 239, 250; 713/176–179

(56) References Cited

U.S. PATENT DOCUMENTS

| | | | | |
|---|---|---|---|---|
| 4,471,164 A | * | 9/1984 | Henry | 380/30 |
| 5,195,136 A | | 3/1993 | Hardy et al. | |
| 5,751,813 A | * | 5/1998 | Dorenbos | 713/153 |
| 5,912,972 A | * | 6/1999 | Barton | 713/176 |
| 5,970,140 A | * | 10/1999 | Sandford et al. | 380/205 |

FOREIGN PATENT DOCUMENTS

EP 0 359 325 A1 9/1989

OTHER PUBLICATIONS

Schneier, B., Applied Cryptography, 1996, John Wiley & Sons, Inc., $2^{nd}$ Edition, pp. 31–32.*
Schyndell, et al., A Digital Watermark, 1994, IEEE.*
Tirkel, et al., Image Watermarking—A Spread Spectrum Application.*
Bruce Schneier, Applied Cryptography, second edition, p. 185–186.*
"A Unified Coding Method of Dithered Image and Text Data Using Micropatterns", Yasuhiro Nakamura and Kineo Matsui, Electronics and Communications in Japan, Part 1, vol. 72, No. 4, 1989, pps. 50–56.
"Secure Spread Spectrum Watermarking for Multimedia", Ingemar J. Cox, Joe Kilian, F. Thomason Leighton, and Talal Shamoon, IEEE Transactions on Image Processing, vol. 6, No. 12, Dec. 1997, pps. 1673–1687.
"Digital Image Watermarking Using Visual Models", Christine I. Podilchuk and Wenjun Zeng, SPIE, vol. 3016, 1997, pps. 100–111.

* cited by examiner

*Primary Examiner*—Gregory Morse
*Assistant Examiner*—Minh Dinh
(74) *Attorney, Agent, or Firm*—Barnes & Thornburg

(57) ABSTRACT

A method of data hiding includes providing a message (68), providing an encrypting sequence (86), and generating an encrypted message (72) based on the message and the encrypting sequence. A carrier signal (66) that conveys information unrelated to the encrypted message is provided, and the encrypted message is embedded (78) into the carrier signal by performing an exclusive-OR of the encrypted message with a first portion of the carrier signal.

8 Claims, 4 Drawing Sheets

HIDING OF ENCRYPTED DATA

CROSS-REFERENCES TO RELATED APPLICATIONS

This application is a U.S. national application of international application serial No. PCT/US98/17321 filed Aug. 21, 1998, which claims priority to U.S. provisional application Ser. No. 60/056,724 filed Aug. 22, 1997.

FIELD OF THE INVENTION

The present invention relates to methods and apparatus for hiding data within a digital signal, and particularly for concealing information within multimedia signals such as digital image, audio, or video signals. More particularly, the present invention relates to methods and apparatus for embedding and retrieving information into and out of a digital signal used in multimedia applications while minimizing the effect on the multimedia application of the digital signal.

BACKGROUND AND SUMMARY OF THE INVENTION

The art of concealing information has existed for millennia and is one to which computers have been readily adapted. It is known, for example, to use computers for encrypting data using various symmetric and asymmetric cryptographic schemes such as the Data Encryption Standard (DES) and RSA encryption, and cryptographic software packages such as PGP (Pretty Good Privacy). Another technique for concealing information for which computers are used is data hiding or steganography, in which the existence of certain information is concealed within a carrier communication. In contrast to cryptography, where it is a goal to make a message undecipherable regardless of its detection, with steganography it is a goal to hide the very existence of the hidden message. An example of a known steganography technique using computers is to embed a digital watermark into a digital image.

According to the present invention, a method of hiding data is provided. A message to be hidden and an encrypting sequence are provided along with a carrier signal that conveys information (unrelated to the message). An encrypted message is generated based on the message and the encrypting sequence. The encrypted message is embedded into the carrier signal by performing an exclusive-OR of the encrypted message with a first portion of the carrier signal.

In preferred embodiments, the carrier signal is a digital image, and the first portion of-the carrier signal is an LSB plane of the digital image. The digital image has a plurality of color planes, the first portion of the carrier signal is an LSB plane of a first color plane, and the second portion of the carrier signal is an LSB plane of a second color plane.

According to another aspect of the invention, the carrier signal is transmitted to a receiving location. The encrypted message is extracted and from the carrier signal and deciphered at the receiving location. In preferred embodiments, the encrypted sequence is generated based on an encrypting key. The encrypted message is generated by performing an exclusive-OR of the message with the encrypting sequence.

According to yet another aspect of the invention, a method of data hiding is provided in which an encryption key and a carrier signal that conveys information unrelated to the encryption key are supplied. An encryption sequence based on the encryption key is generated. The encryption sequence is embedded into the carrier signal.

In preferred embodiments, the encryption key is a public key for an asymmetric encryption algorithm. The carrier signal can be a signal such as a digital image, digital audio, or digital video. The encryption sequence is substantially random, and can be generated based on a linear feedback shift register. The encryption sequence is embedded into the carrier signal by performing an exclusive-OR of the encryption sequence with a portion of the carrier signal.

According to other aspects of the invention, the carrier signal including the embedded encryption sequence is transmitted to a receiving location. The encryption sequence is extracted from the composite signal at the receiving location. The encryption sequence is decrypted to obtain the encryption key. The encryption key is used to generate an encrypted message at the receiving location, and the encrypted message is transmitted from the receiving location.

According to yet another aspect of the invention, a method of data hiding is provided. An encrypted message is embedded into a first portion of a carrier signal and message extraction information is embedded into a second portion of the carrier signal for extracting the encrypted message from the first portion of the carrier signal.

In preferred embodiments, the encrypted message is embedded by performing an exclusive-OR of the encrypted message with the first portion of the carrier signal. The message extraction information is embedded by performing an exclusive-OR of the first portion of the carrier signal with the second portion of the carrier signal. The first and second portions of the carrier signal can be first and second bit-planes of a digital image.

According to still another aspect of the invention, a method of exchanging data hidden in a carrier signal is provided. A signal including hidden data is generated by transforming a carrier signal from a first domain into a second domain. A message is embedded into the carrier signal in the second domain. The carrier signal is transformed back from the second domain to the first domain. The signal including hidden data is sent to a receiving location. The message is obtained from the signal including hidden data at the receiving location by transforming the signal including hidden data into the second domain and extracting the message.

In preferred embodiments, the message is encrypted prior to generating the signal including hidden data. The message is decrypted after obtaining the message from the signal including hidden data.

According to still yet another aspect of the invention, a data hiding apparatus is provided. An encryption sequence generator generates an encryption sequence based on an encrypting key. An encrypted message generator generates an encrypted message based on the encryption sequence and an input message. An encrypted message embedder embeds the encrypted message into a carrier signal.

In preferred embodiments, the encryption sequence generator generates a substantially random encryption sequence. The encrypted message embedder performs an exclusive-OR of the encrypted message with a portion of the carrier signal. The encrypted message embedder replaces a first LSB plane of a digital image with information based on a second LSB plane of the digital image and performs an exclusive-OR of-the encrypted message with the second LSB plane of the digital image. The encrypted message generator performs an exclusive-OR of the input message with the encrypting sequence to generate the encrypted message.

Additional features of the invention will become apparent to those skilled in the art upon consideration of the following detailed description of the preferred embodiments exemplifying the best mode of carrying out the invention as presently perceived.

DETAILED DESCRIPTION OF THE ILLUSTRATIVE EMBODIMENTS

Figure 1:
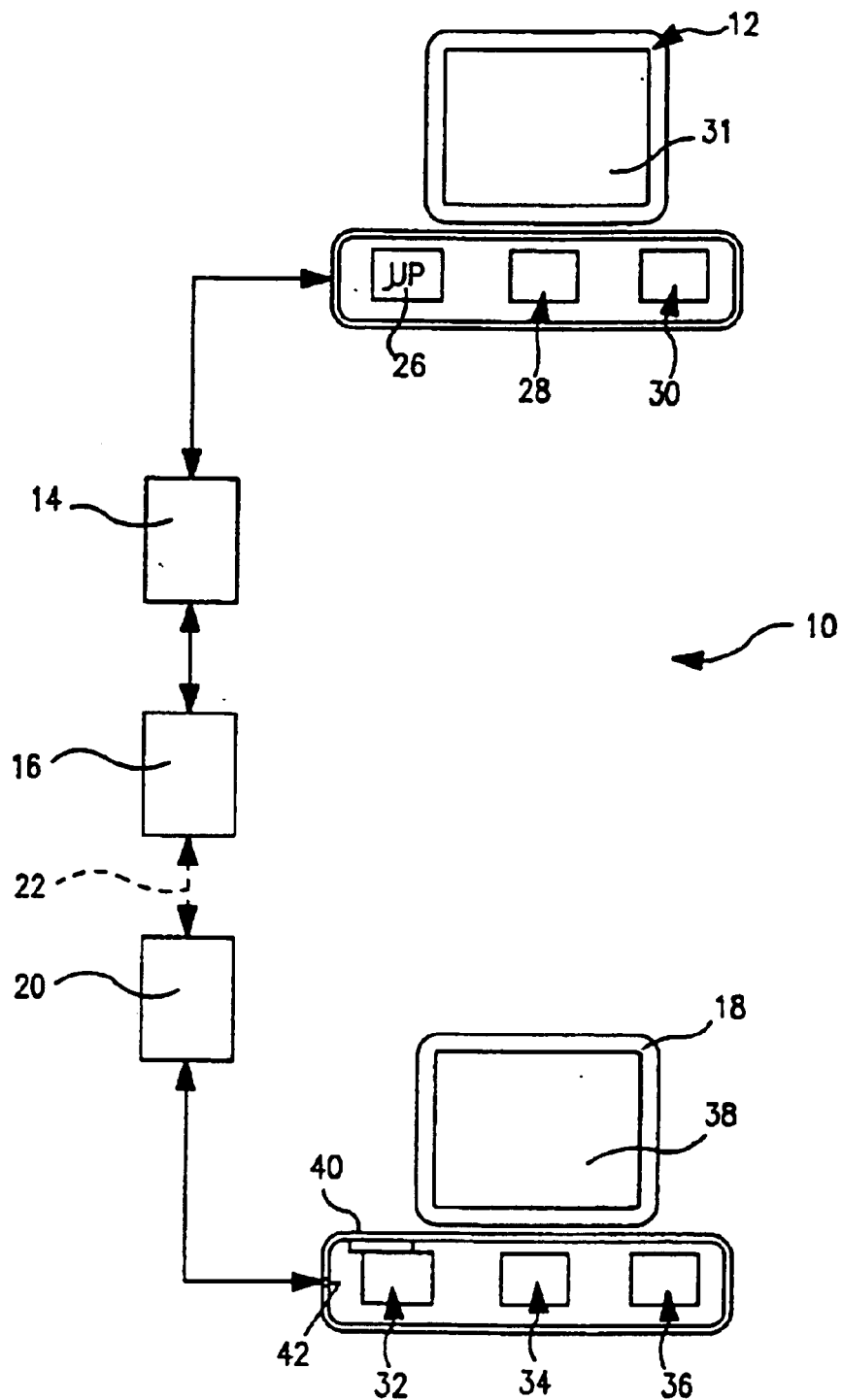
FIG. 1 is a block diagram of two computer systems connected over a network, each computer system configured with a processor and memory for implementing embodiments of the present invention.

The present invention lends itself to implementation in a conventional computer network 10 as shown in FIG. 1. Computer network 10 illustratively includes computer systems 12, 18 connected through a series of network communication devices 14, 16, 20 (e.g., modems, transceivers, etc.) for communication over a network 22 such as the standard telephone lines, or the Internet or World Wide Web. Computer systems 12, 18 are illustratively personal computers and each includes basic elements such as a processor 26, 32, memory 28, 34, storage device 30, 36, and display 31, 38. Computer systems 12, 18 can also include optional peripheral devices such as removable storage device 40 (e.g., a CD-ROM or 3½ inch disk drive).

Figure 2:
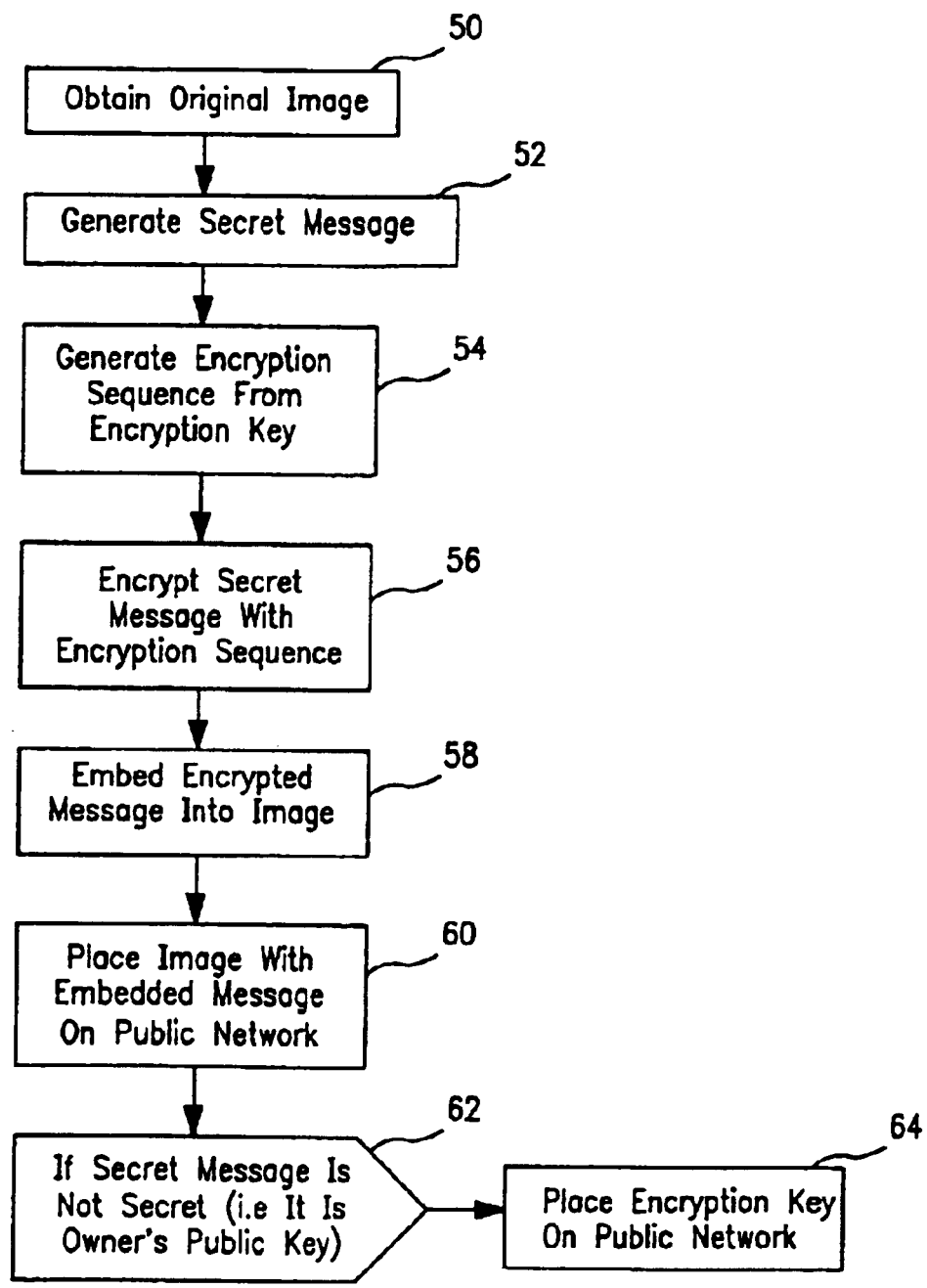
FIG. 2 is a flow chart showing a method according to the present invention for hiding data within an image for transmission over a network.

An exemplary method of data hiding according to the present invention that is suitable for carrying out on computer network 10 is shown in FIG. 2. Although the present invention is disclosed in the context of certain embodiments discussing digital images, other digital signals, such as digital audio or video signals, are also within the scope of the invention.

According to the method of FIG. 2, an image is used to transport and exchange data that is embedded in the image itself and that cannot be perceived by the human eye. An appropriate analogy is that the image acts as an envelope, with the embedded data transmitted with the image being equivalent to a letter contained within the envelope. Conventional encryption such as PGP or RSA is used to enhance security of the embedded data. The security is improved because the encrypted data is hidden within the image and therefore cannot be recognized as such. This allows for secure data communication and exchange over an insecure transmission channel.

In step 50 an original digital image is obtained. A secret message that is desired to be embedded into the image is generated in step 52. A message encrypting key is used in step 54 to generate an encryption sequence. The message encrypting key can be a seed value for use in generating an m-sequence from a linear feedback shift register as discussed in more detail below, although it is understood that any suitable message encrypting algorithm can be used. As also discussed below, the message encrypting key will ultimately be used by the recipient of the image embedded with the secret message.

In step 56 the secret message from step 52 is encrypted with the encryption sequence from step 54 to create an encrypted message. The encrypted message is then embedded into the image in step 58. There are many methods to embed the encrypted message into the image such as the method discussed below, but, again, it is understood that other suitable methods can be used.

The image with the embedded message is then made available such as on a public network as shown in step 60. Finally, if the secret message from step 52 is actually information that is not desired to be kept secret, such as a public key for an asymmetric encryption algorithm, then the encryption key from step 54 is also made available on the public network as shown in steps 62, 64. This allows for third parties to extract the message from the image. Thus, for example, the message can be a public encryption key that is hidden within the image but that is readily available to a party that has knowledge of the fact that the hidden message exists. This provides a convenient way of exchanging information, such as allowing an individual to make a public encryption key available over the World Wide Web by posting it within an image on a Web site, while still concealing the information from the casual observer.

It is useful at this point to provide some preliminary definitions before discussing a specific implementation of the method of FIG. 2. The symbol $\oplus$ denotes a bit exclusive-OR function (equivalently, modulo-2 addition). Table 1 illustrates the exclusive-OR function:

TABLE 1

| A | B | A $\oplus$ B |
|---|---|---|
| 0 | 0 | 0 |
| 0 | 1 | 1 |
| 1 | 0 | 1 |
| 1 | 1 | 0 |

A digital image is typically represented with a two dimensional array of pixel values. If A is the array of pixel values, then A(x,y) denotes the pixel value in the x-th column of the y-th row of the array. Each index x,y begins at zero, and by convention the origin is at the upper-left corner with positive coordinates going rightwards and downwards, although this convention is somewhat arbitrary.

For labeling purposes, it will be assumed that the digital image is a 24-bit RGB image with pixel values ordered as shown in Table 2: xx

TABLE 2

| MSB | | | | | | | | | | | | | | | | | | | | | | | LSB |
|---|---|---|---|---|---|---|---|---|---|---|---|---|---|---|---|---|---|---|---|---|---|---|---|
| Red | | | | | | | | Green | | | | | | | | Blue | | | | | | | |
| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| R7 | R6 | R5 | R4 | R3 | R2 | R1 | R0 | G7 | G6 | G5 | G4 | G3 | G2 | G1 | G0 | B7 | B6 | B5 | B4 | B3 | B2 | B1 | B0 |

Thus, bits 16–23 refer to the red component, bits 8–15 refer to the green component, and bits 0–7 refer to the blue component for any given pixel value. For example, $I_{G0}(x,y)$ refers to the least-significant bit of the green component of the (x,y)-pixel in the image I. Since bit G0 is equivalent to bit 8, $I_{G0}(x,y)$ is equivalent to $I_8(x,y)$. As with the array convention, this labeling convention is somewhat arbitrary.

An m-sequence is a pseudo-random sequence of binary digits (bits). m-sequences have good statistical properties and can be generated by linear feedback shift registers (configured appropriately as is known in the art). Knowing the size (number of bits), structure (the feedback configuration), and initial fill (the initial contents of each bit) of the shift register allows the reconstruction of the entire m-sequence. The m-sequences here illustratively are generated by a 96-bit m-sequence generator. If the structure and size of the shift register are known (as would be the case with this embodiment), and if a consecutive portion of the m-sequence equal to twice the shift register size is also known, the initial fill used to generate the sequence can be determined. In this embodiment the initial fill is used as the key that generates the m-sequence. In this way, the key can be determined from the sequence itself by techniques known to those skilled in cryptography.

When embedding a message into a carrier signal, the order in which pixel operations are performed may be an important consideration. A sequence function z(i) is defined to provide a one-to-one mapping from i->(x,y), where i is an ordinal number and (x,y) refers to coordinate values in an image. The ordinal i ranges from zero to N-1, where N is the total number of pixels in the image. Given a sequence function z(i), one can compute z(0), z(1), z(2), etc., to obtain a sequence of pixel coordinates $(x_1,y_1)$, $(x_2,y_2)$, etc. As an example, z(i)=(i mod ImageWidth, ⌊i/ImageWidth⌋ ) denotes a sequence beginning at the origin and proceeding in a row-by-row fashion.

Figure 3:
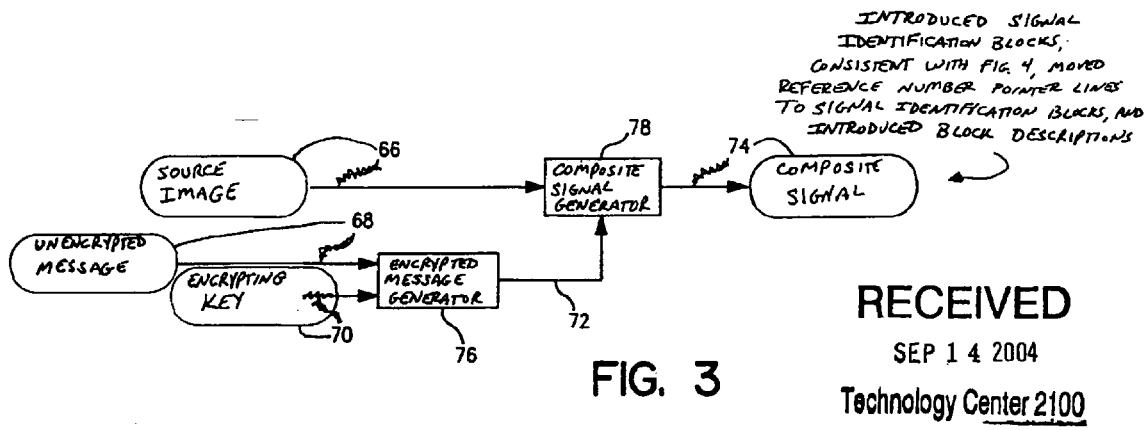
FIG. 3 is a high level block diagram showing a technique for embedding encrypted information into a carrier signal.

Given these preliminary definitions, an implementation corresponding to the illustrative method of FIG. 2 of embedding a message into an image is shown by the block diagram in FIG. 3. Input signals are a source image 66 (obtained in step 50), an unencrypted message 68 (generated in step 52), and an encrypting key 70 (used in step 54). Message 68 and encrypting key 70 are processed by an encrypted message generator 76 to create an encrypted message signal 72. Encrypted message 72 is an input along with source image 66 into composite signal generator 78, which creates a composite signal 74 containing source image signal 66 embedded with encrypted message 72.

Composite signal generator 78 illustratively embeds encrypted message 72 into the least-significant bit in the green plane $I_{G0}(x,y)$ of source image 66 to create a new least-significant green bit-plane $I'_{G0}(x,y)$ of composite signal 74. In order subsequently to extract encrypted message 72 from composite signal 74 (I') it will be necessary to know the original values of $I_{G0}(x,y)$ from source image 66. This can of course easily be accomplished by making the original, unmodified image signal 66 available. Composite signal generator 78, however, eliminates the requirement of using original image signal 66 by encoding the original $I_{G0}(x,y)$ into the least-significant red bit-plane $I'_{R0}(x,y)$ of composite signal 74 as discussed below. Thus, in order to extract the embedded encrypted message 72, only composite signal 74 and the encrypting key 70 are needed.

In order to use the method of FIGS. 2 and 3 both a sender and receiver of composite signal 74 will need an m-bit shift register with identical feedback configurations and a well-defined ordering function z(i) for any arbitrary image. The following steps describe the generation of the composite signal 74 (also referred to as public image I') from original signal 66 (also referred to as original image I), unencrypted message 68 (illustratively a public encryption key, also referred to as $K_{PUB}$), and encrypting key 70 (also referred to as $K_I$). As intimated above, encrypting key 70 ($K_I$) is the initial fill of the m-sequence generator.

In order to generate I', I' is initially set to be an exact copy of I. I' is then traversed in order z(i) and the red and green least-significant bit planes are set to:

$$I'_{R0}(z(i))=I'_{G0}(z(i))\oplus m\text{-seq}(2i)$$

$$I'_{G0}(z(i))=K_{PUB}(i)\oplus I'_{G0}(z(i))\oplus m\text{-seq}(2i+1)$$

where $K_{PUB}(i)$ refers to the I-th bit of $K_{PUB}$, and m-seq(j) refers to the j-th bit in the m-sequence using $K_I$ as the initial fill. With these two equations, information on portion 2 of the image (the green LSB plane) is first placed in portion 1 of the image (the red LSB plane). Then, the message is embedded in portion 2.

To recover $K_{PUB}$ it is only necessary to have the composite signal or public image I' and the encrypting key $K_I$. For each pixel in I' and in the order z(i), the first step is to extract $I_{G0}*(z(i))$ by using the least-significant red bit plane and the m-sequence:

$$I_{G0}*(z(i))=I'_{R0}(z(i))\oplus m\text{-seq}(2i)$$

$I_{G0}*(z(i))$ is identical to $I_{G0}(z(i))$ if there are no errors in I'. Then the i-th bit of $K_{PUB}(i)$ is computed by using $I_{G0}*(z(i))$:

$$K_{PUB}*(i)=I'_{G0}(z(i))\oplus I_{G0}*(z(i))\oplus m\text{-seq}(2i+1)$$

Thus, given $K_I$, it is possible to reconstruct the same m-sequence used to generate I'. Thus, if no errors occur $K_{PUB}*$ should be identical to $K_{PUB}$. Thus, the method of the invention provides for including within the image both the message that is embedded or encrypted in the image as well as the information needed to extract or decrypt the message from the image.

Figure 4:
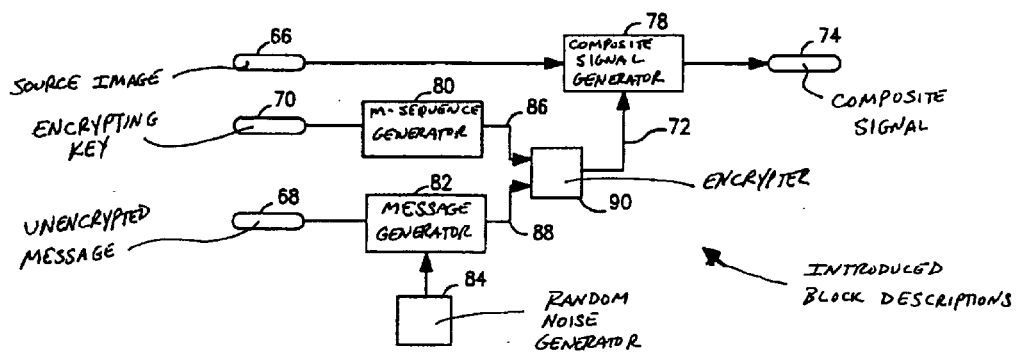
FIG. 4 is a more detailed block diagram similar to FIG. 3 showing a similar, more specific technique for embedding encrypted information into a carrier signal.

A more specific method corresponding to an implementation of the method of FIGS. 2 and 3 is shown FIG. 4. The same input signals are used, that is, source image 66 (I), message 68 (here, Q instead of $K_{PUB}$), and encrypting key 70 ($K_I$) are used. The primary refinement in the method of FIG. 4 as compared with FIG. 3 is an encoding process to handle varying length messages 68.

Message 68, which in the example of FIG. 3 was a public encryption key for use in an asymmetric cryptography system, can more generally simply be a collection of bits intended to be encrypted and is referred to here as Q. The length (i.e., the total number of bits) of Q is denoted |Q|. The i-th bit of the message Q is denoted Q(i), where the bits are numbered from 0 to |Q|−1.

Message 68 (Q) is an input signal to message generator 82 which has as a second input the output from a random noise generator 84. Random noise generator 84 illustratively is also a 96-bit m-sequence generator using an initial fill of a computer system time value, although other suitable random signal generators can be used. Encrypting key 70 ($K_I$) is an input signal (initial fill) to an m-sequence generator 80 that illustratively is the same as random noise generator 84, which then generates as an output an encrypting sequence 86.

Unless the message 68 (Q) will always be the same length (in bits) and that length is the number of pixels in the source image, it will not be possible to embed Q directly onto source image 66 (I). It is therefore necessary to encode additional information that will enable subsequent extraction of messages Q of varying sizes from composite signal 74 (I'). Thus, the message 88 to be encoded onto image 66 (I) is generated by message generator 82 with special properties and is denoted Q' to show that it is derived from Q.

Figure 5:
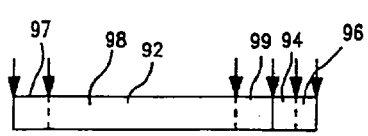
FIG. 5 is a stylized representation of a message format containing embedded, hidden information.

Q' has the following properties. For any given source image I, regardless of what message Q is being encoded, the size of a message Q' is the same as the total number of pixels in image I (that is, |Q'|=# pixels in I). The bits of message Q' are labeled according to standard convention, that is, the first bit (or the left-most bit if Q' is viewed as an ordered bit stream from left to right as shown in FIG. 5) is numbered zero. Thus the bits of Q' are numbered from zero to |Q'|−1.

The structure of Q' is shown in FIG. 5. All bits except the last sixty-four form a data area 92. The last sixty-four bits consist of two thirty-two bit words (StartPos and Length, in that order), which form a Trailer. Data area 92 includes data bits 98 that correspond to the message Q itself, and random bits 97, 99 that help hide the location of Q (bits 98) within Q'. As part of the encoding process, message generator 82 computes the length of message Q and stores its value in the final 32 bits 94 of the Trailer. The value of the length is not directly encoded and instead a value congruent (actual length modulo Data Area size) is placed in the 32-bit word. It is trivial to recover the length from this encoded value.

Starting position 94 describes the location within data area 92 where the bits of the message Q reside. Message generator 82 randomly chooses a place 98 to store Q and populates all other bits of unused portions 97, 99 in data area 92 with random noise generated by random noise generator 84. Thus, Q can be anywhere in data area 92. Including noise for portions 97, 99 of data area 92 unused by message Q improves security of data embedded within I because the noise increases the difficulty of recognizing the existence or location of Q within the data area.

The encoding of each bit of message Q' is encoded onto image I on a one-bit per one-pixel basis using an exclusive-OR as discussed above for the method of FIG. 3. First, the output of m-sequence generator 80 (with $K_I$ as a seed value) is used to encrypt Q' in encrypter 90. Next, the encrypted Q' is embedded onto the LSB green plane $I_{G0}$. Encrypted message Q is subsequently extracted from Q' by locating its starting position and length from the trailer. The extracted Q is then decoded as discussed above.

Figure 6:
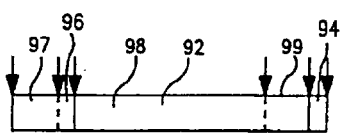
FIG. 6 is a stylized representation similar to FIG. 5 of an alternative message format.

Further implementation steps can be taken to increase security for message Q'. Random number generator 84 and m-sequence generator 80 can be different. Even if both use 96-bit m-sequence generators, this can be achieved simply by changing the feedback coefficients. Moreover, the message length 94 in the trailer can be relocated to data area 92 as shown in FIG. 6. This relocation will limit the ability of an attacker to take advantage of a known size of message Q.

Figure 7:
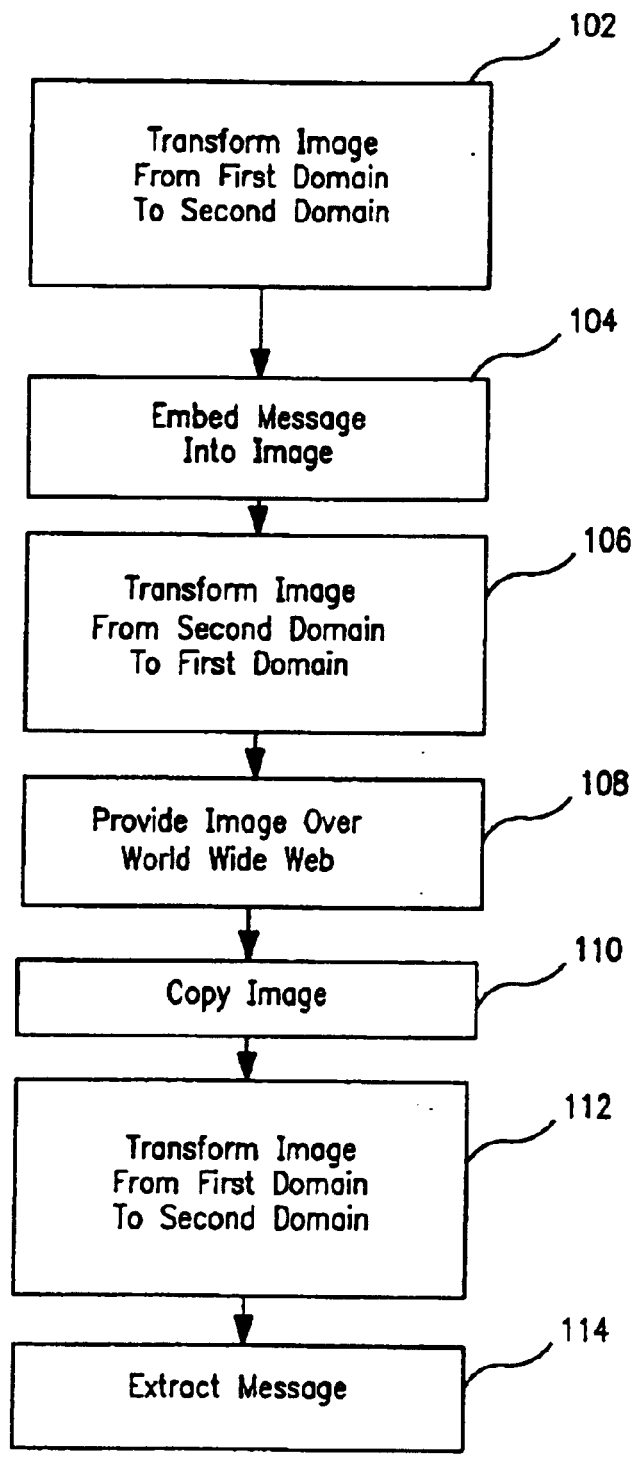
FIG. 7 is a flow chart showing an alternative method according to the present invention for hiding data within an image for transmission over a network.

Another way to provide for security of data hidden within a carrier image is shown by the method of FIG. 7. In step 102 the carrier image is transformed from a first domain to a second domain. For example, a typical RGB image that is considered to be represented in a spatial domain can be transformed using a discrete cosine transform A message is then embedded into the transformed carrier image in step 104, using any appropriate technique for embedding a message onto a carrier signal. An example of a transformed image into which a message can be embedded would be a JPEG image. If desired, the message can also be pre-encrypted before being embedded into the transformed image to further improve security. The image is then transformed back into the first domain in step 106 and made available for access by third parties in step 108.

For a third party to extract the message the steps are essentially reversed. First the image is copied by the third party in step 110, and it is then transformed into the second domain in step 112 using the same transform performed in step 106. Finally, the message is extracted in step 114, again, using any appropriate technique that corresponds to the technique used in step 104 for originally embedding the message. If the message was pre-encrypted then another decryption step (not shown) will be necessary.

Encrypted messages relying on the use of encryption keys are used in the methods discussed above. For example, if a pre-encrypted message is embedded into an image, then the recipient will need a key to decrypt the message. A technique for providing for secure exchanges of encrypted data such as encryption keys that is known in the art is the use of a trusted third party. The trusted third party essentially acts as a secure broker in exchanging data between two other parties. It is within the scope of this invention to exchange information, such as encryption keys, by use of a trusted third party.

Although the invention has been described in detail with reference to certain illustrated embodiments, variations and modifications exist within the scope and spirit of the present invention as described and defined in the following claims.

What is claimed is:

1. A method of data hiding comprising the steps of:

providing a message;

generating an encrypting sequence based on an encrypting key;

generating an encrypted message based on the message and the encrypting sequence;

providing a carrier signal that conveys information unrelated to the encrypted message;

embedding the encrypted message into the carrier signal by performing an exclusive-OR of the encrypted message with a first portion of the carrier signal; and embedding the first portion of the carrier signal into a second portion of the carrier signal.

2. The method of claim 1, wherein the carrier signal is a digital image having a plurality of color planes, the first portion of the carrier signal is an LSB plane of a first color plane, and the second portion of the carrier signal is an LSB plane of a second color plane.

3. A method of data hiding comprising the steps of:

providing an encryption key;

generating an encryption sequence based on the encryption key;

providing a carrier signal that conveys information unrelated to the encryption key;

embedding the encryption sequence into the carrier signal, transmitting the carrier signal including the embedded encryption sequence to a receiving location, extracting the encryption sequence from the composite signal at the receiving location, and deciphering the encryption sequence to obtain the encryption key at the receiving location.

4. The method of claim 3, further comprising the steps of encrypting a message using the encryption key to generate an encrypted message at the receiving location and transmitting the encrypted message from the receiving location.

5. A method of data hiding comprising the steps of:

providing a carrier signal that conveys information unrelated to the encryption key;

embedding the encryption sequence into the carrier signal transmitting the carrier signal including the embedded encryption sequence to a receiving location, extracting the encryption sequence from the composite signal at the receiving location, and deciphering the encryption sequence to obtain the encryption key at the receiving location.

6. The method of claim 5, wherein the step of embedding message extraction information includes performing an exclusive-OR of the first portion of the carrier signal with the second portion of the carrier signal.

7. The method of claim 6, wherein the first and second portions of the carrier signal are first and second bit-planes of a digital image.

8. A data hiding apparatus comprising:

an encryption sequence generator configured to generate an encryption sequence based on an encrypting key;

an encrypted message generator configured to generate an encrypted message based on the encryption sequence and an input message; and an encrypted message embedder configured to embed the encrypted message into a carrier signal by replacing a first LSB plane of a digital image with information based on a second LSB plane of the digital image and performing an exclusive-OR of the encrypted message with the second LSB plane of the digital image.

* * * * *

UNITED STATES PATENT AND TRADEMARK OFFICE
CERTIFICATE OF CORRECTION

PATENT NO. : 6,912,658 B1
DATED : June 28, 2005
INVENTOR(S) : Glogau et al.

It is certified that error appears in the above-identified patent and that said Letters Patent is hereby corrected as shown below:

Column 9, lines 16-23 through Column 10, lines 1-2,
Claim 5 should read:
-- A method of data hiding comprising the steps of:
embedding an encrypted message into a first portion of a carrier signal; and
embedding message extraction information into a second portion of the carrier signal for extracting the encrypted message from the first portion of the carrier signal, wherein the step of embedding an encrypted message includes performing an exclusive-OR of the encrypted message with the first portion of the carrier signal. --.

Signed and Sealed this

Fourth Day of October, 2005

JON W. DUDAS
*Director of the United States Patent and Trademark Office*